United States Patent
Ledez et al.

(10) Patent No.: US 10,452,481 B2
(45) Date of Patent: Oct. 22, 2019

(54) DEVICE FOR CONTROLLING THE REINITIALIZATION OF A COMPUTER ON BOARD AN AUTOMOBILE

(71) Applicant: PSA AUTOMOBILES SA, Poissy (FR)

(72) Inventors: Frederic Ledez, Jouy en Josas (FR); Sebastien Fusinelli, Mery sur Oise (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/327,275

(22) PCT Filed: Sep. 1, 2017

(86) PCT No.: PCT/FR2017/052321
§ 371 (c)(1),
(2) Date: Feb. 21, 2019

(87) PCT Pub. No.: WO2018/050984
PCT Pub. Date: Mar. 22, 2018

(65) Prior Publication Data
US 2019/0188084 A1  Jun. 20, 2019

(30) Foreign Application Priority Data
Sep. 13, 2016 (FR) .................................. 16 58541

(51) Int. Cl.
*G06F 11/00* (2006.01)
*G06F 11/14* (2006.01)
(Continued)

(52) U.S. Cl.
CPC ...... *G06F 11/1441* (2013.01); *G06F 11/3024* (2013.01); *G06F 11/3495* (2013.01); *B60R 16/023* (2013.01)

(58) Field of Classification Search
CPC .... G06F 11/079; G06F 11/00; G06F 11/0736; G06F 11/0757; G06F 11/0772
See application file for complete search history.

(56) References Cited

U.S. PATENT DOCUMENTS 4,386,427 A   5/1983   Hosaka
4,532,594 A   7/1985   Hosaka et al.
(Continued)

FOREIGN PATENT DOCUMENTS

FR   2770917 A1   5/1999

OTHER PUBLICATIONS

International Search Report for corresponding PCT/FR2017/052321, dated Dec. 14, 2017.
(Continued)

*Primary Examiner* — Charles Ehne
(74) *Attorney, Agent, or Firm* — Sandberg Phoenix & von Gontard PC

(57) ABSTRACT

The invention pertains to a control device (1) for a computer (10) for an automotive vehicle, said control device (1) being able to cooperate with the computer (10) to perform a plurality of functions, said control device (1) comprising: a command module (20); a reinitialization module (30), adapted to reinitialize said command module (20) for a duration of reinitialization less than a predetermined maximum duration of reinitialization, and a monitoring module (40), adapted to dispatch a reinitialization signal to said reinitialization module (30) should a malfunction be detected, the control device (1) being noteworthy in that the command module (20) comprises a sub-module of at least one temporarily interruptible function (23), said at least one temporarily interruptible function (23) exhibiting a permitted maximum duration of interruption greater than said predetermined maximum duration of reinitialization.

9 Claims, 2 Drawing Sheets

(51) Int. Cl.
*G06F 11/34* (2006.01)
*G06F 11/30* (2006.01)
*B60R 16/023* (2006.01)

(56) References Cited

U.S. PATENT DOCUMENTS

| | | | |
|---|---|---|---|
| 6,134,655 A | 10/2000 | Davis | |
| 2006/0277448 A1* | 12/2006 | Koto | G06F 11/0757 714/55 |
| 2012/0053778 A1* | 3/2012 | Colvin | G07C 5/008 701/29.4 |
| 2013/0204484 A1* | 8/2013 | Ricci | G06F 17/00 701/29.4 |
| 2014/0325287 A1* | 10/2014 | Nair | G06F 11/0757 714/47.1 |
| 2015/0323608 A1* | 11/2015 | Jung | G06F 1/26 702/58 |
| 2016/0196176 A1* | 7/2016 | Thompson | G06F 11/0739 714/57 |
| 2016/0299234 A1* | 10/2016 | Zeng | G01S 19/52 |
| 2017/0255507 A1* | 9/2017 | Milor | G06F 17/5022 |

OTHER PUBLICATIONS

Written Opinion for corresponding PCT/FR2017/052321, dated Dec. 14, 2017.

* cited by examiner

DEVICE FOR CONTROLLING THE REINITIALIZATION OF A COMPUTER ON BOARD AN AUTOMOBILE

CROSS-REFERENCE TO RELATED APPLICATIONS

This application is the U.S. National Stage under 35 USC § 371 of International Application No. PCT/FR2017/052321, filed 1 Sep. 2017 which claims priority to French Application No. 1658541 filed 13 Sep. 2016, both of which are incorporated herein by reference

BACKGROUND

The invention generally relates to controlling the proper function of a microprocessor or a microcontroller of a computer, notably on board a vehicle. An effect of the invention is thus to provide a device for controlling the reinitialization of a computer, particularly meant for automotive vehicles.

It is known that an automotive vehicle comprises a plurality of functional devices controlled by a command device, called a computer. Such a computer allows the command of the vehicle's lights (brake lights, turn signals, etc.) or the commands of the front and back windshield wipers to be activated, for example.

In reference to FIG. 1, a computer comprises a command module, comprising a microcontroller or a microprocessor, ensuring a plurality of functions allowing functional devices of the vehicle to be controlled. Based on the context (luminosity, temperature, etc.), these functions are in an active or inactive state. However, as is known, such a computer may sometimes have malfunctions.

According to the prior art, a monitoring device, commonly known as a "watchdog," may be integrated into the computer to monitor its proper state of function. FR 2770917 describes a control system of a vehicle computer comprising a monitoring device. Such a monitoring device allows the operating state of the functions of the command module of the computer to be monitored. The control system described in FR 2770917 furthermore comprises means for reinitializing all of the functions of the command module in case a malfunction is detected.

Such a monitoring device typically functions by transmitting a signal which is periodically issued by the command module, allowing a timer to be regularly rearmed. When an action of the command module takes too long to be performed, the signal is not sent and the timer continues its countdown until the end. The monitoring device then commands an automatic reinitialization of the computer when the signal is no longer sent and the timer is not rearmed.

During the reinitialization of the computer, some of the aforementioned functions of the command module must be conserved or placed in a defined state with an aim to ensure the safety of the vehicle passengers and/or not to disturb the driver, while other functions may be interrupted. It is then known to differentiate between so-called "maintained" functions, when the corresponding function must be controlled within a precise output state—active, inactive or any other value, or remain in an unchanged state—during the reinitialization of the computer, and so-called "interruptible" functions, when the corresponding function can be deactivated, regardless of its state (active, inactive or any other value) during the reinitialization of the computer. In other words, functions "maintained" during reinitialization refer to functions having to be controlled, namely forced into a state, active, inactive or any other value, or unchanged, i.e. maintained in a state identical to the state before reinitialization. "Interruptible" functions refer to functions which can be interrupted during reinitialization, i.e. whose output state is of little importance during reinitialization.

As non-limiting examples, functions having to be maintained, i.e. controlled in an output state, during the reinitialization of the computer, correspond to the running lights of the vehicle, which must remain active in case of operation in nighttime conditions, or even the car horn which, on the other hand, must be kept in an inactive state throughout reinitialization.

However, this maintenance of functions maintained in a controlled state (active, inactive or any other value) or unchanged during the reinitialization phase may require the use of additional electronic components. In particular for each of the functions maintained in an unchanged state, it is known to use, for example, a demultiplexer comprising a storage module, known as a "latch." Such a demultiplexer commands the signals dispatched by the functions of the command module and spreads them along the paths for which they are meant (maintained active or inactive, for example). In other words, such a set of demultiplexers allows the output states of the functions maintained to be sorted, between those maintained active, those maintained inactive and those maintained unchanged. Furthermore, the latch allows the storage of this output state of the maintained functions requested by the command module.

Such a "watchdog" monitoring device thus comprises a latch for each of the functions having to be forced or maintained in an unchanged state, which presents the disadvantage of using a large number of electronic components. Moreover, such a computer, comprising so many components, presents a high cost.

BRIEF SUMMARY

The invention thus aims to overcome these disadvantages by proposing a less expensive command module, requiring few electronic components.

More precisely, to achieve this result, a control device for a computer particularly on board an automotive vehicle is provided. The control device is able to cooperate with the computer to perform a plurality of functions, and the functions of the plurality of functions provide outputs corresponding respectively to outputs from the computer. The control device comprises:

a command module, a reinitialization module adapted to reinitialize the command module upon receiving a reinitialization signal, the initialization having a duration of reinitialization less than a predetermined maximum duration of reinitialization, and a monitoring module capable of detecting a malfunction of the computer, the monitoring module being adapted to dispatch the reinitialization signal to the reinitialization module should a malfunction be detected, the control device being characterized in that the command module comprises a sub-module of at least one temporarily interruptible function, the at least one temporarily interruptible function exhibiting a permitted maximum duration of interruption greater than the predetermined maximum duration of reinitialization, during which the outputs of said at least one temporarily interruptible function are not provided.

Such a control device allows a minimum quantity of electronic components to be used, thus allowing a less expensive computer to be used.

Advantageously, the command module furthermore comprises a sub-module of maintained functions and a sub-module of interruptible functions, the outputs of the maintained functions being saved and provided during a reinitialization of the computer and the outputs of the interruptible functions being interrupted during a reinitialization of the computer without a limit of duration. Thus, the command module allows the functions to be classified into three distinct groups: maintained functions, interruptible functions, and temporarily interruptible functions.

Advantageously, the control device comprises a storage module for the outputs of the maintained functions commanded by the command module, allowing the state of the functions requested to be stored in the memory.

Advantageously, the control device comprises a switching module capable of ensuring the switching of the outputs of the computer, allowing the outputs of the computer to correspond to the outputs of the functions of the command module.

Advantageously, the computer comprises the command module.

Advantageously, the computer comprises the reinitialization module.

Advantageously, the computer comprises the monitoring module.

Advantageously, the computer comprises the storage module.

Advantageously, the computer comprises the switching module.

The invention also relates to a vehicle comprising a control device according to an embodiment of the invention.

DESCRIPTION OF THE DRAWINGS

Other characteristics and advantages of the invention will become apparent upon reading the detailed descriptions of the embodiments of the invention, given only as an example, and in reference to the drawings, wherein.

DETAILED DESCRIPTION

The embodiments described below relate more particularly to an implementation of the device according to the invention in an automotive vehicle. However, any implementation in a different context, particularly in any kind of vehicle, is also contemplated by the present invention.

Figure 1:
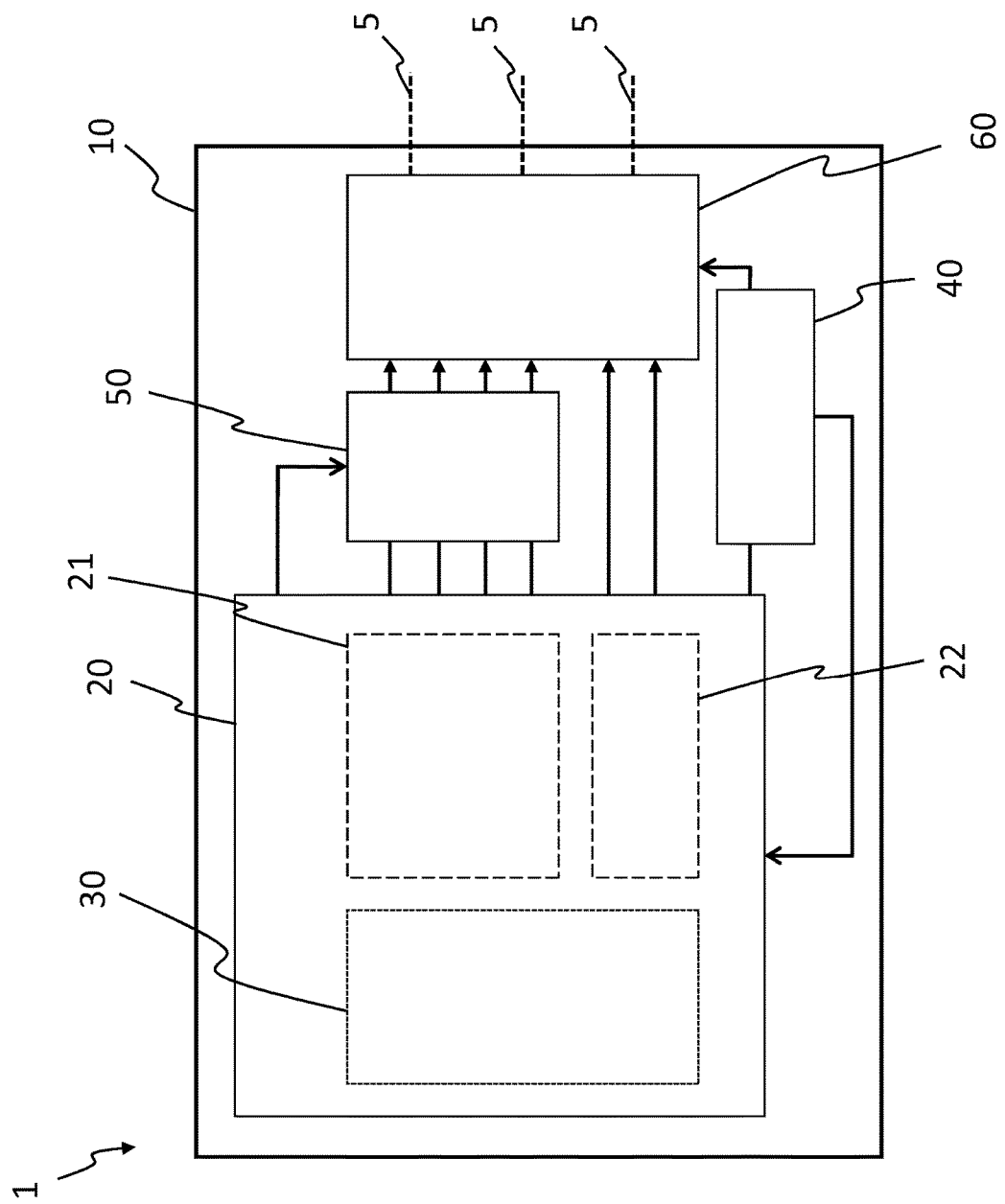
FIG. 1 shows a diagram of a control device according to the prior art.
Figure 2:
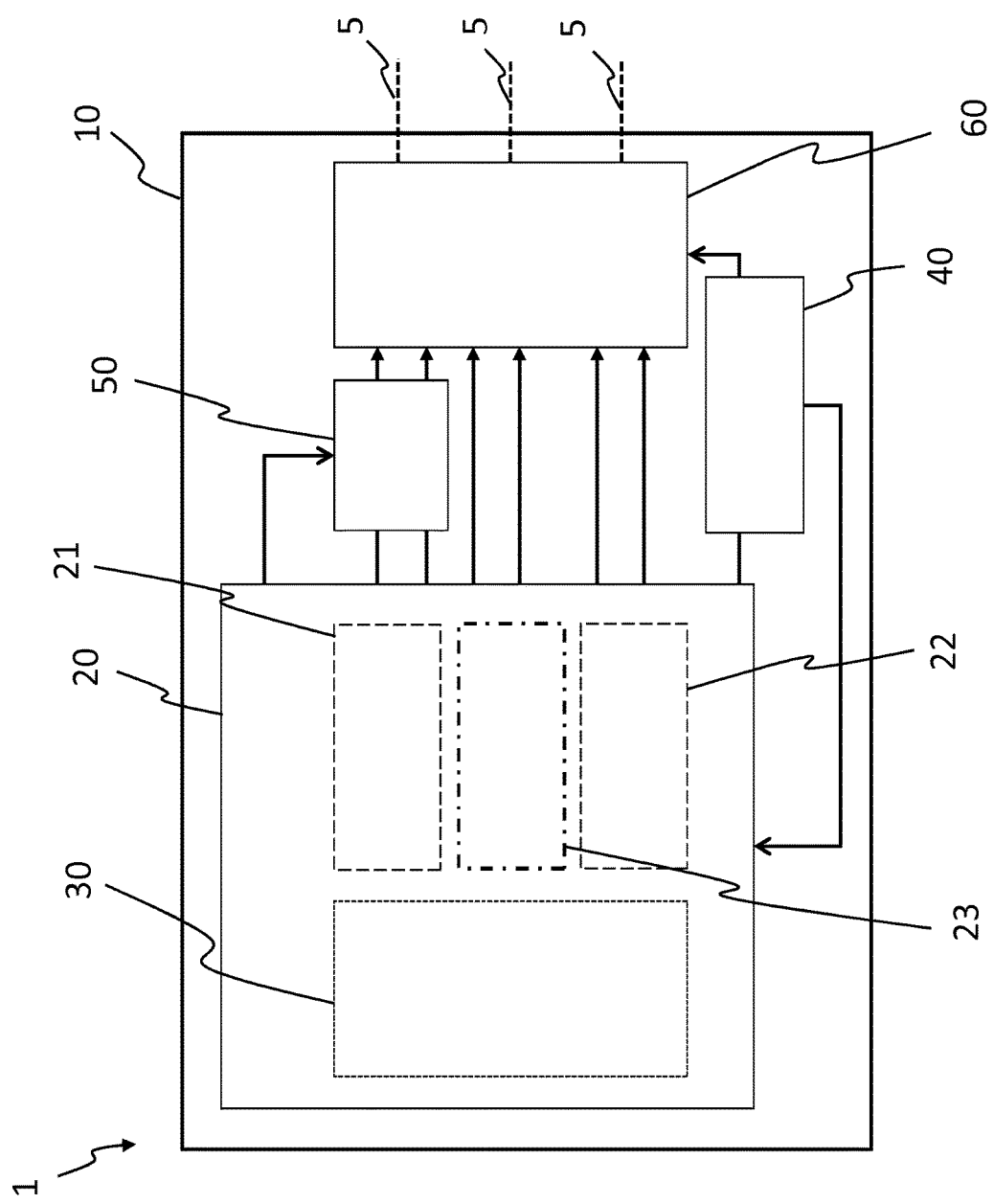
FIG. 2 shows a diagram of a control device according to a preferred embodiment of the invention.

FIG. 2 represents a computer 10 comprising a command module 20 ensuring that the functional devices of a vehicle, more particularly of an automotive vehicle, are controlled according to a preferred, non-limiting embodiment of the invention.

To this end, as described above, an automotive vehicle comprises a plurality of functional devices controlled by the computer 10. The computer 10, generally known as an Electronic Control Unit (ECU), is a mounted system that controls all of the devices of an automotive vehicle. Such a computer 10, which can malfunction, typically comprises a control device 1 cooperating with the computer 10 to ensure a certain number of functions are controlled. Whether it is integrated into the computer 10 or separate from the computer 10, a monitoring module 40, often called a "watchdog," is able to detect a malfunction and reinitialize the computer 10, as is known to a person skilled in the art.

According to a preferred embodiment, in reference to FIG. 2, such a control device 1 comprises:

a command module 20 which defines a state of the outputs of the functions, a reinitialization module 30 which reinitializes the computer 10 should a malfunction be detected, a monitoring module 40 which sends a reinitialization signal to the reinitialization module 30 should a malfunction of the computer 10 be detected, a storage module 50 which stores the state of the outputs of the functions requested by the command module 20 in the memory, and a switching module 60 which ensures the correspondence between the outputs of the functions and the outputs 5 of the computer 10, the outputs of the functions being received directly from the command module 20 or received from the storage module 50.

The command module 20, comprising a microcontroller or a microprocessor, using the hardware resources of the computer 10, provides a plurality of functions. Each of these functions presents an output state, typically active, inactive or unchanged, associated with a functional device of the vehicle, such as the means of signaling and/or lighting, the windshield wipers, etc. As described above, throughout the reinitialization of the computer 10, some functions, known as maintained functions 21, must be in a controlled state (forced or unchanged). This state may be maintained active voluntarily, such as the running lights or the windshield wipers necessary for rainy weather, maintained inactive or maintained in an unchanged state, identical to the state before reinitialization.

Other functions, not impacting the safety of the passengers or the comfort of the driver, known as interruptible functions 22, are defined as being interruptible functions, i.e. able to be deactivated. The interruption of a function means that the associated functional device is deactivated throughout the reinitialization of the computer 10. In other words, the functional device associated with the interrupted function is not controlled, the output state of the associated function (typically active or inactive) is of little importance.

The command module 20 also comprises a plurality of functions, known as temporarily interruptible functions 23, the temporary interruption of which does not impact either the safety of the passengers or the comfort of the driver, provided that this interruption does not exceed a maximum predetermined duration corresponding to an allowed interruption duration of the functions.

To this end, each function is provided, as designed, to be able to be interrupted or not, and, when it may be interrupted, it is determined whether there is a maximum interruption duration. This classification of the functions, ensured by the command module 20, takes into consideration, in particular, the safety of the vehicle and the passengers, as well as the comfort of the passengers.

Still in reference to FIG. 2, the command module 20 thus allows the functions ensured by the command module 20 to be classified, using the hardware resources of the computer 10, into three distinct categories so as to form three groups of functions. These three groups allow the output states for each function to be managed in case of reinitialization of the computer 10. Thus, the command module 20 comprises:

a sub-module of maintained functions 21, a sub-module of interruptible functions 22, and a sub-module of temporarily interruptible functions 23.

During a reinitialization of the computer 10, the maintained functions 21 are controlled in a state defined as active, inactive or unchanged. Such a maintained function 21 is typically activated or deactivated voluntarily or even kept in a state identical to its state before reinitialization. The interruptible functions 22 may be deactivated during the entire reinitialization of the computer 10, as can the temporarily interruptible functions 23 determined, when designing the computer 10, as having an acceptable interruption duration greater than the maximum reinitialization duration of the computer 10.

Throughout this reinitialization, it is helpful to store the aforementioned output state of the maintained functions 21 of the command module 20. To this end, the computer 10 comprises a storage module 50, comprising a plurality of storage blocks commonly known as "latches." Such a storage module 50 allows the requested state of the maintained functions 21, typically active, inactive or any other value, to be read and memorized. In practice, the storage module 50 comprises one latch per maintained function 21.

The control device 1 according to a preferred embodiment of the invention also comprises a monitoring module 40, commonly known as a "watchdog." Such a monitoring module 40 allows the proper state of function of all the modules and the functions of the computer 10 to be monitored.

In practice, a monitoring module 40 typically comprises a timer coupled with an electronic circuit or specialized software allowing it to ensure that the computer 10 will not be blocked by performing a list of activities. The function of the electronic circuit is typically based on the principle that each step must be performed in a predetermined maximum time. At the end of each step, a signal is sent to the computer 10, allowing the timer to be reset to zero. If the time to perform an action exceeds the predetermined duration, then no signal is sent.

Such a signal is typically sent to a reinitialization module 30, known as a "Reset." According to a preferred embodiment, in reference to FIG. 2, the command module 20 comprises the reinitialization module 30. Such a reinitialization module 30 allows the signal sent by the monitoring module 40 to be read. In case of a malfunction of the computer 10, the reinitialization module 30 activates the reinitialization of the computer 10. According to the preferred embodiment described in this document, the reinitialization of the computer 10 is performed by reinitializing the command module 20.

Finally, the control device 1 according to an embodiment of the invention comprises a switching module 60 ensuring the switching of the outputs 5 of the computer 10 associated with the functions of the command module 20.

The embodiment described in this document presents a computer 10 comprising a control device 1 and comprising, to this end, the command module 20, the reinitialization module 30, the monitoring module 40, the storage module 50, and the switching module 60, but it goes without saying that such a control device 1 or each of the modules of the control device 1 could be included in a vehicle outside of the computer 10.

The invention claimed is:

1. A control device for a computer, said control device being able to cooperate with the computer to perform a plurality of functions, said plurality of functions providing outputs corresponding respectively to output from the computer, each of these functions having an output state, said control device comprising:
    a command module,
    a reinitialization module adapted to reinitialize said command module upon receiving a reinitialization signal, said initialization having a duration of reinitialization less than a predetermined maximum duration of reinitialization, and
    a monitoring module capable of detecting a malfunction of the computer, said monitoring module being adapted to send the reinitialization signal to said reinitialization module should a malfunction be detected, the command module comprising:
        a sub-module of at least one temporarily interruptible function, said at least one temporarily interruptible function having a permitted maximum duration of interruption greater than said predetermined maximum duration of reinitialization, during which the outputs of said at least one temporarily interruptible function are not provided,
        a sub-module of maintained functions, and
        a sub-module of interruptible functions,
        the outputs of said maintained functions being saved and provided during a reinitialization of the computer and the outputs of said interruptible functions being interrupted during a reinitialization of the computer without a limit of duration.

2. The control device according to claim 1, comprising a storage module for storing the outputs of the maintained functions commanded by the command module.

3. The control device according to claim 1, comprising a switching module capable of ensuring the switching of the outputs of the computer to correspond to the outputs of the functions.

4. The control device according to claim 1, wherein the computer comprises the command module.

5. The control device according to claim 1, wherein the computer comprises the reinitialization module.

6. The control device according to claim 1, wherein the computer comprises the monitoring module.

7. The control device according to claim 1, wherein the computer comprises the storage module.

8. The control device according to claim 1, wherein the computer comprises the switching module.

9. A vehicle comprising the control device according to claim 1.

* * * * *